United States Patent
Cornish et al.

(10) Patent No.: US 7,259,231 B2
(45) Date of Patent: *Aug. 21, 2007

(54) EXTRACTION AND FRACTIONATION OF BIOPOLYMERS AND RESINS FROM PLANT MATERIALS

(75) Inventors: Katrina Cornish, Vista, CA (US); Jeffrey A. Martin, Carlsbad, CA (US); Rodger T. Marentis, Macungie, PA (US); Sebastian Plamthottam, Upland, CA (US)

(73) Assignee: Yulex Corporation, Maricopa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/249,884

(22) Filed: Oct. 12, 2005

(65) Prior Publication Data

US 2006/0106183 A1 May 18, 2006

Related U.S. Application Data

(60) Provisional application No. 60/618,167, filed on Oct. 12, 2004.

(51) Int. Cl.
*C08F 6/04* (2006.01)
*C08J 3/02* (2006.01)

(52) U.S. Cl. .................. 528/483; 209/19; 209/21; 209/133; 528/489; 528/490; 528/493; 528/494; 528/495; 528/496; 528/499; 528/500; 528/502 A; 528/502 C; 528/930

(58) Field of Classification Search ............ 528/1, 528/930–931, 937, 483, 489, 499, 500, 502 A, 528/502 C, 490, 493, 494, 495, 496; 209/19, 209/21, 133

See application file for complete search history.

(56) References Cited

U.S. PATENT DOCUMENTS

| | | | |
|---|---|---|---|
| 3,616,222 A | 10/1971 | Dasinger | |
| 3,806,619 A | 4/1974 | Zosel | |
| 3,812,012 A | 5/1974 | Buschmann et al. | |
| 3,972,775 A | 8/1976 | Wilke et al. | |
| 3,990,944 A | 11/1976 | Gauss et al. | |
| 3,990,945 A | 11/1976 | Huff et al. | |
| 4,009,075 A | 2/1977 | Hoge | |
| 4,089,745 A | 5/1978 | Antrim et al. | |
| 4,094,742 A | 6/1978 | Bellamy | |
| 4,097,333 A | 6/1978 | Freytag et al. | |
| 4,104,409 A | 8/1978 | Vitzthum et al. | |
| 4,684,715 A | 8/1987 | Kay et al. | |
| 5,171,592 A * | 12/1992 | Holtzapple et al. | 426/69 |
| 5,849,854 A * | 12/1998 | Noda | 528/1 |
| 6,054,525 A | 4/2000 | Schloman, Jr. et al. | |
| 6,569,375 B1 | 5/2003 | McGlothlin et al. | |
| 6,623,600 B1 | 9/2003 | Henriksen | |

FOREIGN PATENT DOCUMENTS

| | | | |
|---|---|---|---|
| JP | 4-264035 | * | 9/1992 |
| JP | 9-143489 | * | 6/1997 |

OTHER PUBLICATIONS

Fukushima, Y., "Application of Supercritical Fluids," magazine article, R&D Review of Toyota CRDL, vol. 35, No. 1, pp. 1-9, Nov. 8, 1999.
Vasukumar, K. et al., "Supercritical Fluid Rechnology in Pharmaceutical Research," CRIPS, vol. 4, No. 2, pp. 8-12, Apr.-Jun. 2003.
"Subcritical Water Processing," internet article, http://222.scrub.lanl.gov/2002/scf/capability/water.htm, pp. 1-3, Jan. 18, 2004.

* cited by examiner

*Primary Examiner*—Ana Woodward
(74) *Attorney, Agent, or Firm*—Christine Meis McAuliffe; Jennings Strouss and Salmon, PLC

(57) ABSTRACT

A method for the extraction, separation, fractionation and purification of biopolymers from plant materials using supercritical and/or subcritical solvent extractions is disclosed. Specifically, the process can be used for the separation of resins and rubber from guayule shrub (*Parthenium argentatum*), and other rubber and/or resin containing plant materials, using supercritical solvent extraction, for example supercritical carbon dioxide extraction. Additionally, polar and/or non-polar co-solvents can be used with supercritical carbon dioxide to enhance the selective extraction of resins and rubbers from the shrub.

38 Claims, No Drawings

US 7,259,231 B2

EXTRACTION AND FRACTIONATION OF BIOPOLYMERS AND RESINS FROM PLANT MATERIALS

CROSS REFERENCE TO RELATED APPLICATIONS

This Application claims the benefit of priority of U.S. Provisional Application Ser. No. 60/618,167, filed Oct. 12, 2004.

FIELD OF THE INVENTION

This invention relates in general to the extraction, separation, fractionation and purification of resins and biopolymers from plant materials using supercritical solvent extractions. Specifically, the invention relates to a process for the separation of resins and rubber from the guayule shrub (*Parthenium argentatum*) using supercritical solvent extraction, for example, supercritical carbon dioxide extraction. Additionally, co-solvents can be used with supercritical carbon dioxide to enhance the selective extraction of resins and rubbers from the plant material. Finally, subcritical water extraction may also be used according to this invention.

BACKGROUND OF THE INVENTION

Guayule is a desert shrub native to the southwestern United States and northern Mexico and which produces polymeric isoprene essentially identical to that made by *Hevea* rubber trees (e.g., *Hevea brasiliensis*) in Southeast Asia. As recently as 1910 it was the source of half of the natural rubber used in the U.S. Since 1946, however, its use as a source of rubber has been all but abandoned in favor of cheaper *Hevea* rubber and synthetic rubbers. However, demand for natural rubber is expected to produce shortages of that material in the future and rubber prices are expected to rise significantly. Natural rubber having lower heat hysteresis is required for many kinds of tires and amounts to about 35% of U.S. rubber use.

As an alternative to synthetic rubber sources, attention is being directed to the production of hydrocarbons in plants such as guayule (*Parthenium argentatum*). Guayule normally yields one half ton to one ton of rubber per acre in cultivation when, after two years, the entire plant is harvested and processed. Guayule plants store latex in tiny inclusions in the bark, making harvest of the outer fibrous layers, or bagasse, of the plant, desirable.

Using traditional techniques, as much as 95% of the available natural rubber may be recovered from plant materials, using parboiling, which coagulates the latex in the cells, followed by a milling step in a caustic solution to release the rubber. This traditional process then causes the milled bagasse to sink to the bottom of the processing vessel and allows resin to float to the surface for collection. More specifically, in traditional processes, resins from plant materials are obtained by solvent extraction with polar solvents such as alcohols, ketones, and esters. A commonly used solvent for extracting the guayule resin is acetone. The resin is recovered from the solution by evaporating the solvent. The rubber from the shrub is generally extracted using hydrocarbon solvents such as hexane, cyclohexane or toluene. Such processes are normally very expensive and not environmentally friendly. A water floatation method has also been used for the extraction of rubber.

Further, using traditional methods of guayule processing, plant material is prepared by initially grinding it into small particles. Generally, the entire plant is fed whole, that is, with the leaves thereon as well as dirt or foreign debris, into a grinding apparatus, for example, a hammermill. The ground material can be flaked, that is crushed, by adding to a two-roll mill or other conventional equipment, which ruptures the rubber-containing cells. The comminuted plants are subjected to a resin-rubber solvent system. The solvent system contains one or more solvents which extract the resin as well as the rubber from the guayule-type shrub. Examples of single-solvent systems include halogenated hydrocarbons having from 1 to 6 carbon atoms, such as chloroform, perchloroethylene, chlorobenzene, and the like; and aromatic hydrocarbons and alkyl-substituted aromatic hydrocarbons having from 6 to 12 carbon atoms, such as benzene, toluene, xylene, and the like.

This solvent system typically contains one or more polar resin solvents as well as one or more hydrocarbon rubber solvents. Typical polar resin solvents include alcohols having from 1 to 8 carbon atoms, such as methanol, ethanol, isopropanol and the like; esters having from 3 to 8 carbon atoms such as the various formates, the various acetates and the like; ketones having from 3 to 8 carbon atoms, such as acetone, methyl ethyl ketone, and the like. Typical non-polar hydrocarbon rubber solvents include alkanes having from 4 to 10 carbon atoms, such as pentane, hexane, and the like; and cycloalkanes having from 5 to 15 carbon atoms, such as cyclohexane, decalin, the various monoterpenes, and the like. Although the two types of solvents can form a two-phase system, they often form a single phase when utilized in proper proportions. One manner of adding different type solvents to the shrub is separately, but simultaneously. However, they are generally prepared as a mixture and added as such.

Accordingly, numerous combinations of a polar resin solvent and a hydrocarbon rubber solvent can exist. A specific solvent system is an azeotropic composition of approximately 80% by weight of pentane, more specifically 78.1% by weight, and 20% by weight of acetone, more specifically 21.9% by weight. The ratio by weight of solvent to the amount of shredded shrub can be any amount sufficient to generally extract most of the rubber and resin, as for example from about 1 part by weight of solvent up to about 20 parts by weight of solvent for each 1 part by weight of shrub, and preferably about 3 parts by weight of solvent to 1 part by weight of shrub. The rubber-resin miscella so obtained typically contains about 1 to 25% by weight of total solids, that is resin plus rubber, and preferably about 9 to 18% by weight of total solids with the amount of resin by weight being from about 1 to about 3 parts for every 1 part by weight of rubber.

Furthermore, traditional methods of plant processing have been hampered by the use of these highly toxic compounds and cumbersome processes. For example, in prior industrial operations, hexane and heptane solvents have been used in the solvent extraction of oil-containing vegetable matter. The extraction apparatus typically includes vertical extraction towers, screw extractors and bucket extractors. With current equipment, several extraction stages are necessary in order to circulate the miscella and attain sufficient wetting of the material to be extracted, thereby requiring the use of a higher proportion of solvent.

In addition, overall energy consumption inherent in previous slurry separations has been excessive, if not prohibitive. Processing of this type of plant material traditionally requires wetting to form a liquid slurry, a high amount of heat, and a difficult separation of the solvent from the extracted oil and defatted meal. Complete removal of solvents, such as hexane, from the spent botanical residue is practically impossible by conventional steam stripping techniques.

The method of using gaseous solvents at both supercritical and subcritical conditions, such as carbon dioxide and propane, is also problematic. In these systems, the operating pressure must exceed 125 psi to remain in liquid state and even higher if temperatures are elevated. Because of the difficulties in working at high pressure, multiple extraction vessels are required, which limits the speed and efficiency of these extractions. Further, it is difficult to maintain pressures consistently, resulting in freezing, gumming, or poor separation of the extracted materials, which may clog the system. Also hydrolysis of lipids or inadequate processing may decrease the yield.

In an effort to overcome some of these difficulties, in recent years cellulose degradation methods using enzymes such as pectin hydrolases, cellulose, alkalis, or acids have been taught. In addition, the prior art teaches a number of processes for production of glucose from cellulose in the presence of lignin. Crushing and extraction processes for hydrocarbon-containing plants have also been taught. However, prior art processes have not dealt with the problem of obtaining hydrocarbons from hydrocarbon-containing plants wherein the hydrocarbon content is low and is contained in laticifer cells.

Additionally, traditional extraction methods make it difficult and inefficient to extract resins from plant materials, particularly from the bagasse. Bagasse is difficult to extract with hydrocarbon solvents for several reasons. First, the compounds of interest are adhered in the botanical matrix, so the material needs to be ground finely for accessibility of the solvent to these compounds. Second, the compounds of interest are significantly different in polarity, namely, resins are polar and rubber is non-polar. This makes it difficult to utilize a single solvent system, and therefore, most extraction processes utilize a two-solvent extraction system, e.g., acetone for resin extraction followed by cyclohexane for rubber extraction. Third, ground bagasse has physical properties that translate into very slow percolation rate for liquid solvents. Fourth, contact with oxygen can oxidize the rubber extract in other processes.

Thus, it has been difficult to design a commercially viable process for the extraction of bagasse with liquid solvents. Additionally, due to the problems with slow percolation rate through the bagasse, traditional processing methods have resulted in a low commercial output, and much of the unused bagasse contains residual solvents. The residual solvents in the remaining bagasse pose environmental safety hazards and make the excess bagasse mostly unusable for other applications. Finally, the low output makes these prior art extraction processes not commercially viable methods of extraction.

Therefore, a need exists for a cost-effective, efficient, and environmentally friendly method of extracting and fractionating rubber and resins from plant materials, such as guayule.

DETAILED DESCRIPTION OF THE INVENTION

The present invention utilizes supercritical solvents, such as carbon dioxide, optionally in combination with other co-solvents, for the separation, fractionation and purification of low molecular weight resins and high molecular weight biopolymers, such as rubber, from plant materials, such a guayule. One embodiment uses supercritical carbon dioxide for the simultaneous extraction, separation, fractionation and purification of rubber and resins from guayule plant materials. Alternate embodiments of the present invention comprise the steps of resin and rubber extraction with supercritical carbon dioxide, separation, fractionation and purification of rubber and resins in succession rather than simultaneously.

As disclosed herein, the present invention is a method of extracting high molecular weight biopolymers, for example, rubber, and resin, from plant material using supercritical fluid at medium to high pressures. In at least one embodiment, carbon dioxide gas is compressed into a dense liquid, this liquid is then pumped into a cylindrically-shaped high-pressure vessel containing the guayule shrub, the extract laden liquid is then pumped into a separation chamber, where the extract is separated from the gas, and the gas is recovered for reuse. Many variations of these processes and conditions, as disclosed herein, can be used including different co-solvent systems and methods of plant material preparation. These will be apparent to those skilled in the relevant art.

While supercritical fluid extraction processes have been used commercially for the extraction of alkaloids, flavor components, perfumes and the like, for the reasons articulated above, this process previously has not been shown to be effective or useful in extracting high molecular weight biopolymers from plant materials as complex as guayule, which contain thousands of secondary products.

Rubber is a naturally-occurring hydrocarbon polymer of cis-1,4-polyisoprene with 400-50,000 isoprene monomeric units enzymatically linked in a head-to-tail configuration. It is to be understood that the rubbers from numerous plants, such as guayule plants, are defined herein as "guayule type" rubbers and hence can be utilized either alone or in combination with each other. Hereinafter whenever reference is made to guayule plants or shrubs, it is to be understood that the below-described plants and shrubs can also be utilized.

Guayule-type plants which can be utilized to prepare rubber-containing miscellae include guayule, gopher plant (*Euphorbia lathyris*), mariola (*Parthenium incanum*), rabbitbrush (*Chrysothamnus nauseosus*), candelilla (*Pedilanthus macrocarpus*), Madagascar rubbervine (*Cryptostegia grandiflora*), milkweeds (*Asclepias syriaca, speciosa, subulata*, et al.), goldenrods (*Solidago altissima, graminifolia, rigida*, et al.), Russian dandelion (*Taraxacum kok-saghyz*), mountain mint (*Pycnanthemum incanum*), American germander (*Teucreum canadense*), and tall bellflower (*Campanula americana*). Many other plants which produce rubber and rubber-like hydrocarbons are known, particularly among the Asteraceae (Compositae), Euphorbiaceae, Campanulaceae, Labiatae, and Moraceae families, and hence can be utilized.

Plant materials may be obtained using a variety of conventional and experimental harvesting processes. Generally, plants are cultivated, harvested and bailed using standard farming practices. Various portions of a plant may be used to obtain plant materials, including leaves, bark, stems, root systems or root balls.

The plant need not be de-leafed because the metal ions such as manganese, iron and copper in the leaves that could promote oxidative degradation of the rubber are not extracted into the rubber solvents. Further, processing the plant, including the leaves, may add to the quality of the bagasse because the leaves contain mineral, nitrogenous and carbohydrate components that could enhance the quality of the bagasse for certain post-processing applications. Further, in this embodiment of the invention, the process results in three products: total shrub rubber, total shrub resin and total shrub bagasse.

The plants may be processed by de-leafing or de-barking using mechanized shearing or hand shearing, or may be processed with leaves and washed without de-leafing or de-barking. Removal of the leaves from the harvested shrub prior to the disclosed supercritical extraction process would permit the leaf wax to be isolated and sold separately. Defoliation will also eliminate the wax as a possible contaminant in the resin and rubber solvents.

Initial processing of plant materials may consist of a high pressure water system to strip the bark or leaves off the plant. Plant materials may be processed at a processing facility by conveyor, and any leftover plant material transported away for further refining or disposal. Secondary processing prior to extraction may further comprise grinding, hammermilling, or forcibly fractionating whole or partial plant materials into smaller pieces. The plant material may also be ground and then pelleted. Plant material may also be pre-treated by either enzymatic degradation of whole or partial plants. Optionally, the bagasse may then be further extracted according to the methods disclosed herein.

The extraction process disclosed herein can be carried out on a large scale using industrial extraction equipment, or on the small scale using a typical laboratory scale units such as the Spe-ed SFE-2 from Applied Separations, 930 Hamilton Street, Allentown, Pa., 18101.

In the supercritical state, solvents, or supercritical fluids (SCFs), can readily penetrate porous and fibrous materials, and are particularly well adapted to processing guayule plant materials. Since the solvating powers can be adjusted by changing the pressure or temperature, separation and fractionation of resins and rubber is fast and easy. In addition, fractionation can be improved and extraction enhanced for high molecular weight components by adding modifiers or co-solvents, making SCFs a highly-versatile solvent to utilize with improved separation/fractionation capabilities when compared to conventional organic liquid solvent extraction processes.

Generally, SCFs are fluids that exist at the transition between liquids and gases, and share some qualities of each. A pure SCF is any compound at a temperature and pressure above the critical values (e.g., a fluid is termed 'supercritical' when the temperature and the pressure exceed the critical pressure point (CP) of a vapor-liquid coexistence curve). More specifically, a fluid is termed supercritical when the temperature and pressure are higher than the corresponding critical values. The critical temperature of a fluid is the temperature above which liquefaction is not possible at any pressure.

Critical pressure ("CP") is further defined as the pressure required to liquefy a gas at the critical temperature. At temperatures and pressures above those at the critical point, fluids are at supercritical conditions. A supercritical fluid is characterized by physical and thermal properties that are between those of the gas and pure liquid. The fluid density is a strong function of the temperature and pressure. Above the critical temperature of a compound, the pure gaseous component cannot be liquefied regardless of the pressure applied. The CP is the vapor pressure of the gas at the critical temperature. In the supercritical state, only one phase exists. This phase retains solvent power approximating liquids as well as the transport properties common to gases.

For example a comparison of typical values for density, viscosity, and diffusivity of gases, liquids and SCF's is as follows:

TABLE 1

Comparison of physical and transport properties of gases, liquids and SCFs.

| Property | Density (kg/m3) | Viscosity (cP) | Diffusivity (mm2/s) |
|---|---|---|---|
| Gas | 1 | 0.01 | 1-10 |
| SCF | 100-800 | 0.05-0.1 | 0.01-0.1 |
| Liquid | 1000 | 0.5-1.0 | 0.001 |

It is noted that pressure and temperature may be manipulated using a combination of isobaric changes in temperature with isothermal changes in pressure. Using SCFs, it is possible to convert a pure component from a liquid to a gas (and vice versa) via the supercritical region without incurring a phase transition. The behavior of a fluid in the supercritical state can be described as that of a very mobile liquid, and the solubility behavior approaches that of the liquid phase while penetration into a solid matrix is facilitated by the gas-like transport properties.

As a result, the rates of extraction and phase separation can be significantly faster than for conventional extraction process, and extraction conditions can be controlled much better to, further optimize separation. SCF extraction is known to be dependent on the density of the fluid, which in turn may be manipulated through control of the system pressure and temperature. Further, the dissolving power of SCF increases with isothermal increase in density or an isopyonic (i.e., constant density) increase in temperature.

Under thermodynamic equilibrium conditions, the visual distinction between liquid and gas phases, as well as the difference between liquid and gas densities disappear at and above the critical point. Similar drastic changes exist in properties of a liquid mixture as it approaches the thermodynamic critical loci of the mixture. This provides the more gas-like physical properties of SCF, including thermal conductivity, surface tension, constant-pressure heat capacity and viscosity, which are far superior to standard liquids to enchance mass transfer during extraction. For example, if comparing a liquid organic solvent with a supercritical fluid solvent with the same density, the thermal conductivity and diffusity of a SCF are higher and the viscosity is much lower. Furthermore, with SCFs, surface tension and heat of vaporization have almost completely disappeared.

Supercritical fluids are an alternative to organic solvents in industrial purification and re-crystallization operations, because they provide a more environmentally-friendly process and eliminate some of the dangers to workers that are associated with traditional organic methods. SCF-based extraction processes do not produce the VOC and ODC emissions that are the by-products of traditional organic processes. Supercritical fluids are commonly used to extract analytes from samples.

For example, supercritical fluid extraction (SFE) processes are commonly used in the food industry, e.g., for coffee and tea decaffeination and for beer brewing. SCF processes are also used in polymer, pharmaceutical, lubricant, and fine chemical industries and are valued for their potential to increase product performance levels over traditional processing technologies. In addition, SCFs are used in the recovery of organics from oil shale, separations of biological fluids, bio-separation, petroleum recovery, crude de-asphalting and de-waxing, coal processing, selective extraction of fragrances, oils and impurities, pollution control, and combustion.

Supercritical fluids provide the advantage that they are inexpensive, extract the analytes faster and are more environmentally friendly than organic solvents. For example, SCFs have solvating powers similar to liquid organic solvents but with higher diffusivities, lower viscosity, and lower surface tension. The solvating power can also be adjusted easily by changing the pressure or temperature for efficient separation of analytes. According to one embodiment, carbon dioxide is used as the supercritical solvent. Alternately, other supercritical solvents are also used, including, but not limited to, ammonia, water, nitrous oxide, xenon, krypton, methane, ethane, ethylene, propylene, propane, pentane, methanol, ethanol, isopropanol, isobutanol, chlorotrifluoromethane, monofluoromethane, cyclohexanol, toluene and other solvents known in the art.

Supercritical fluid carbon dioxide has the gas-like physical properties of very low surface tension, low viscosity and high diffusivity, which allow a supercritical fluid solvent to penetrate an ultra low porosity substrate, such as a bed of finely ground bagasse, in a fixed bed extractor vessel and dissolve the compounds of interest. Supercritical carbon dioxide appears to have sufficient polarity at medium to high pressures and temperatures to be an adequate solvent of the resinous materials (but is a poor solvent for the rubber). Finally, supercritical carbon dioxide, because of its low surface tension, low viscosity and high diffusivity, can penetrate the bed of ground bagasse at a very high percolation rate, which allows for a very quick extraction when compared to hydrocarbon solvents. Using supercritical $CO_2$ is advantageous over other extraction methods and has the potential to be the superior process for resin and rubber extraction on a commercial scale.

Following initial processing of plant material, described in more detail below, the plant material is contacted with carbon dioxide near or above the supercritical conditions for a sufficient time to solubilize the resin and/or rubber components, forming a supercritical solution. As will be disclosed more fully herein, this is followed by a collection process in which the resins and rubber, which precipitate out from the supercritical solution, are collected when the pressure is reduced to atmospheric level. The pressures used for extraction can range from about 1500 psi to about 10,000 psi, depending on the temperature, for the supercritical carbon dioxide and for the carbon dioxide with modifier co-solvent systems.

In another embodiment, the guayule shrub is first extracted with supercritical carbon dioxide at high temperatures and pressures and the temperature and pressure conditions are lowered or changed to precipitate the various insoluble fractions. In yet another embodiment, fractionation can be carried out by extracting guayule shrub at different temperatures and pressures, going from low to high, and collecting each fraction, a novel way to make different melting point resins. Preferably, this method of extraction can be used to fractionate the resins and rubber in a single system and with a single solvent.

The steps of the disclosed method are capable of being performed in various orders or, in some cases, as noted, at approximately the same time. For example, in one embodiment, simultaneous extraction of resin and rubber using a non-polar co-solvent is followed by fractionation in a supercritical fluid system, for example, using supercritical $CO_2$, into a rubber fraction and a resin fraction.

More specifically, the present invention discloses a method of rubber and resin extraction in at least the following alternate and non-limiting ways: (1) approximately simultaneous extraction of rubber and resin using a supercritical solvent, such as supercritical $CO_2$ without use of any co-solvents; (2) approximately simultaneous extraction of resin and rubber using a non-polar co-solvent, followed by fractionation in a supercritical fluid system, for example, using supercritical $CO_2$, into a rubber fraction and a resin fraction; or (3) high pressure supercritical fluid extraction at a specific narrow range of pressure and temperatures to remove the resin, followed by a high pressure solvent extraction in the same vessel, with cyclohexane or similar non-polar solvent to remove the rubber; or (4) high pressure solvent extraction at a specific range of temperature and pressure with cyclohexane or similar non-polar solvent to remove the rubber, followed by high pressure supercritical fluid extraction at a specific narrow range of pressure and temperatures to remove the resin.

Each of the above alternate embodiments of the disclosed methods are then each optionally followed by a final rinse of supercritical carbon dioxide to remove the residual solvent from the bagasse.

Referring now to the embodiment of the disclosed method comprising simultaneous extraction of rubber and resin, the method comprises a simultaneous resin and rubber extraction utilizing supercritical carbon dioxide at specific pressure, preferably between 1500 and 10,000 psi, and more preferably between 5,000 and 10,000 psi, with a temperature range between 60-100° C. An alternate embodiment further includes using a non-polar co-solvent, preferably at a co-solvent ratio 3-10 times the feedstock weight, in order to simultaneously extract the resins and the rubber. According to the present disclosure non-polar co-solvents include, but are not limited to, hexane, hexene, octane, pentane, cyclohexane, iso-octane, and 1-hexene. Another embodiment alternately includes using a polar co-solvent, for example, water, ethanol, methanol and acetone. Additionally, the present disclosure includes a supercritical fluid extraction further including both a polar co-solvent and a non-polar co-solvent.

The simultaneous extraction is followed by a fractionation step, utilizing a supercritical fluid system to fractionate the material into a rubber fraction and a resin fraction. The fractionation is then followed by a rinse of pure carbon dioxide, which removes the residual solvent from the bagasse.

In an alternate embodiment, high pressure supercritical fluid extraction at a specific narrow range of pressure and temperatures to remove the resin is followed by a high pressure solvent extraction in the same vessel, with a non-polar solvent to remove the rubber. In another embodiment, high pressure solvent extraction is carried out at a specific range of temperature and pressure with cyclohexane or similar non-polar solvent to remove the rubber, followed by high pressure supercritical fluid extraction at a specific narrow range of pressure and temperatures to remove the resin. In yet another embodiment, one or more of the above processes are then optionally followed by a final rinse of supercritical carbon dioxide to remove the residual solvent from the bagasse.

The removal of the resins and the second extraction is performed under pressure, which allows circumvention of the slow percolation problem, and provides a method capable of obtaining a high yield of rubber from the product with this method. The final rinse with carbon dioxide allows for elimination of the environmental problem. Another version of this second process utilizes a polar solvent that is selective for resin such as alcohol or acetone to accelerate the removal of the resin and in some cases to suppress the extraction of the rubber for an even higher yield and purity of resin and rubber fraction.

The present disclosure also envisions the use of subcritical liquid for the extraction process. Many variations of these process and conditions can be used such as different co-solvent systems, subcritical conditions to extract low molecular weight fractions, and the like, and these will be apparent to those skilled in the art. Specifically though, the subcritical method comprises contacting plant material with a compressed gas solvent, wherein the temperature and pressure of the solvent are at subcritical liquid conditions; maintaining the subcritical liquid for a sufficient time, wherein the biopolymer and the solvent form a subcritical liquid solvent solution; and extracting the biopolymer by percolation of the subcritical liquid through a bed of the plant material utilizing an inert percolation aid such as diatomaceous earth.

As an additional alternate step, plant material is stored prior to processing. Specifically, a presoaking process is used prior to the supercritical extraction. In this embodiment, storage comprises mixing the material in communited form with at least one essentially water-free organic liquid to form a slurry in which the material is protected from contact with oxygen and then storing said slurry for at least 24 hours. In this embodiment, the organic liquid may be selected from (1) alcohols, ethers, esters and ketones having one to eight carbon atoms; (2) hydrocarbon solvents having a boiling range within about 20°-100° C.; (3) concentrated resin miscella; (4) hydrocarbon/guayule rubber/guayule resin miscella; (5) hydrocarbon/guayule rubber miscella comprising said hydrocarbon solvent and about 2-4% guayule rubber, or (6) mixtures thereof. In this embodiment, the liquid is acetone or acetone/resin miscella and contains a stabilizer such as a para-phenylenediamine stabilizer.

Additionally, the storage of the plant material may comprise the entire non-defoliated plant and may be dried to a moisture content of about 5-25% before forming the slurry. In some embodiments, the slurry is subjected to mild agitation. This storage method prevents development of offensive odors, due to the degradation, as well as prevents microfloral growth on the shrub. This method also allows communited guayule/organic solvent slurry to be pumped from one processing unit to another, avoiding undue exposure of the material to air. In addition, the invention permits partial or essentially complete extraction of useful products from the shrub during storage, thus reducing costs, time and equipment required.

Another alternate additional step is pretreatment of the plant material to increase the efficiency of the supercritical extraction process and/or increase the yield of rubber and resin produced in the extraction. In one embodiment of the present invention, the pretreatment step comprises the application of a guanidine salt solution to the plant material, to soften the plant cell tissue and denature the protein coat that surrounds each globule of rubber, in order to facilitate the release of rubber into solution.

Once the rubber and resin have been extracted, the bagasse recovered from the solvent extraction process is relatively free of water and could be used as a fuel to supply the power requirements of the disclosed system and method, or as a separate marketable product. Alternatively, complete hydrolysis of the bagasse can be affected to fermentable sugars, which could be used as such or fermented to prepare ethanol.

The resins which are extracted from the shrub are also recoverable and are a mixture of terpenes, terpenoids, parthenoids and glycerides of fatty acids. The resin component also contains a valuable hard wax similar to carnauba wax. The resins can be used as an adhesive in plywood and as a component in varnishes. Further, resin can also be used as a tackifying resin in the manufacture of reinforced composite rubber articles such as tires and car radiator hoses.

EXAMPLES

The process of extraction of resins and rubber is explained in the following examples; the examples set forth herein below are to be understood as not limiting the disclosure. Examples 1-15 disclosed herein are performed according to one or more embodiments of the disclosed method. The results of these experiments illustrate the advantages of using the disclosed supercritical extraction method. In order to measure and analyze the rubber and resin extracts, the ASE (accelerated solvent extraction) method is used to measure the percent rubber and resin extracted using supercritical solvent extraction according to the present disclosure.

The ASE system used for determining rubber and resin extracted using the disclosed method comprises the following: a polypropylene centrifuge tube, 50 ml, with skirt; aluminum weighing dish, 70 mm diameter, with tab; a drying oven, Thelco Model 130DM (or equivalent); a centrifuge, Dynac Model 420101 (or equivalent); an analytical balance, Mettler Toledo AG 104 (or equivalent) with resolution of 0.01 mg; a vacuum oven, VWR Model 1400E (or equivalent); and an Accelerated Solvent Extractor (A.S.E.), Dionex Model 200 with solvent controller; extraction cells, 11 ml with filter discs; Borosillicate vials, 40 ml, with septa and lids; and a coffee grinder. Further, according to one embodiment, the following reagents are used: acetone; cyclohexane, methyl alcohol; nitrogen; and Ottawa sand.

The analysis of the extract begins by placing the plant material, such as the whole guayule shrub, or coarsely or finely ground guayule shrub, in a supercritical fluid extraction (SFE) pressure vessel. In one embodiment of the invention, the guayule shrub is chopped into small pieces. In an alternate embodiment, the guayule shrub is shredded or finely ground first.

Specifically, the sample of plant material is prepared by weighing the entire fresh sample and then cutting the branch tissue into 2 cm lengths. The plant material is also reduced through a chipper using a ⅜" round hole screen to achieve the same particle size. Once reduced in size, the plant material is again weighed. The plant material is then dried in a suitable oven at 80° C. Once dried, the plant material is again weighed. Next, the plant material is ground in a coffee grinder or other suitable apparatus. Then, the sample material is stored in jars or vials in a refrigerator.

The analysis is performed according to the following method. First, a 1.5 g prepared plant material sample is placed into a tared aluminum dish. Second, another dish and a centrifuge tube is weighed for each sample. Third, sand (approximately 2.5-3 g) is mixed with the sample, transferred to a cell (screw on bottom, place a filter inside), and screw on top of cell. Additional sand is added to fill. The top and bottom are checked for tightness to prevent the run from aborting due to solvent leak.

The cell is then loaded into top tray of ASE. A "blank" cell (filled with only sand) is then loaded in the first position. The labeled vials are then loaded into bottom tray and empty vials are placed in the R1-R4 positions. The system is checked to verify that there is enough solvent in the bottles. The gas is turned on followed by the ASE.

For the examples below, the following program schedule comprises three cycles of 20 minutes each with an oven temperature at 140° C. A 100% methyl alcohol flush is used with a 60 second purge and a 50% acetone/50% cyclohexane rinse. The samples are then loaded and the run is started. The vials are placed into a freezer until ready to centrifuge. The vials are shaken gently (not stirred). About 20 ml of the sample mixture is poured or pipetted into the centrifuge tube and an equal amount of methyl alcohol is added. The vial is capped and is centrifuged at 3500 rpm for 20 minutes.

Following centrifugation, all but about 5 ml of supernatant is poured or pipetted off into the aluminum pan. The remainder of extract is added to the tube. The vial is rinsed with 5 ml cyclohexane, and the rinse is added to the tube. The vial is then rinsed with 5 ml acetone, and that rinse is also added to tube. Finally, an equal amount of methyl alcohol is added to centrifuge tube. The tube is then capped and centrifuged at 3500 rpm for 20 minutes.

Following this centrifugation, all supernatant is poured off into the pan, and the pan and the tube are left to dry in the hood. The dry pan is then placed in vacuum oven at 60° C. for 30 minutes. The pan and tube are then weighed and the percent resin and rubber are calculated using the following formulas:

Formula 1:
$$\% \text{ Resin} = \frac{\text{Dried wt. of Acetone extract}}{\text{Sample wt.}} \times 100$$

Formula 2:
$$\% \text{ Rubber} = \frac{\text{Dried wt. of Cyclohexane extract}}{\text{Sample wt.}} \times 100$$

The following is a sample calculation illustrating use of the above rubber and resin formulas:

| | |
|---|---|
| A) Sample weight | 1.4919 g |
| B) Al dish tare wt. for acetone extraction | 2.2214 g |
| C) Al dish + extracted residue | 2.3304 g |
| D) Acetone residue wt. = (C − B) | 0.1090 g |
| E) Tube tare wt. for cyclohexane extraction | 11.2777 g |
| F) Tube + extracted residue | 11.3118 g |
| G) (Cyclo)hexane residue wt. = (F − E) | 0.0341 g |

Formula 1:
$$\% \text{ Resin} = \frac{0.1090 \text{ g}}{1.4919 \text{ g}} \times 100 = 7.31\%$$

Formula 2:
$$\% \text{ Rubber} = \frac{0.0341 \text{ g}}{1.4919 \text{ g}} \times 100 = 2.29\%$$

Example 1

50 ml Extraction of Natural Rubber with Pure $CO_2$ (5000 psi, 60° C.)

12.78 g of guayule shrub feedstock is placed in a 50 ml extraction vessel and extracted with pure carbon dioxide at a pressure of 5000 psi and a temperature of 60° C. The flow rate is 3 liters/minute. The extraction time is thirty minutes. A total of 0.37 g of solid yellow material is extracted (2.89% of feedstock), plus an additional 0.06 g accumulated in the cold trap. Supercritical carbon dioxide at these processing conditions shows high selectivity for resin. The extract sample has a resin concentration in the $CO_2$ of 37.04% and is among the highest of all the samples submitted. However the yield at 2.89% of feedstock is much lower than higher pressure and temperature samples. The percentage of rubber in the extract is 2.77% of the feedstock, which is a high value for organic non-polar co-solvents.

Example 2

50 ml Extraction with Hexane Co-Solvent (9800 psi, 100° C.)

15.05 g of guayule shrub feedstock is placed in an extraction vessel and extracted with carbon dioxide and 60 g of hexane co-solvent at a pressure of 9800 psi and a temperature of 100° C. The flow rate is 3 liters/minute. The time of extraction is twenty-three minutes. 1.21 g of dark green film is extracted (8.04% of feedstock). An additional 1.41 g of primarily hexane is collected in the cold trap. Supercritical carbon dioxide at these processing conditions shows the best extraction capability for rubber when compared to all the other previous experiments.

The extract sample has a resin concentration in the $CO_2$ of 16.20% and is among the lowest concentration of resin; however, the yield at 8.04% of feedstock is higher than previous experiments. The percentage of rubber in the extract is 4.98% of the feedstock. These process conditions indicate that the presence of relatively low concentration of hexane co-solvent appears to promote the extraction of rubber. The analysis of the residue shows that the concentration of residual resin is 2.2% using the ASE method, and the concentration of rubber in the residue is 1.8%. This example illustrates the increased rubber yield using the disclosed supercritical solvent extraction method including a non-polar solvent.

Example 3

50 ml Extraction with Hexane Co-Solvent (5000 psi, 100° C.)

15.00 g of guayule shrub feedstock is placed in an extraction vessel and extracted with carbon dioxide and 110 g of hexane co-solvent at a pressure of 5000 psi and a temperature of 100° C. The flow rate is 3 liters/minute. The extraction is run for forty-five minutes. 0.71 g of dark green film is extracted (4.73% of feedstock). An additional 14.89 g of primarily hexane is collected in the cold trap. Supercritical carbon dioxide at these processing conditions shows good extraction capability for rubber. The extract sample has a low resin concentration of 15.44% and a high yield of 4.73% feedstock. The percentage of rubber in the extract is 9.40% of the feedstock. These process conditions indicate that the presence of relatively high concentration of hexane co-solvent promote the extraction of rubber and slightly increase the extraction of resin. Using the ASE method, the analysis of the residue shows that the concentration of residual resin is 2.0%, and the concentration of rubber in the residue is 0.8%. This example further illustrates the increased rubber yield using one embodiment of the disclosed method, namely supercritical solvent extraction including a non-polar co-solvent.

Example 4

50 ml Extraction with Hexane Co-Solvent (9800 psi, 102° C.)

13.88 g of guayule shrub feedstock is placed in an extraction vessel and extracted with carbon dioxide and 100 g of hexane co-solvent at a pressure of 9800 psi and a temperature of 102° C. The flow rate is 3 liters/minute. The extraction is run for fifteen minutes. 0.71 g of dark green film is extracted (5.12% of feedstock). An additional 7.38 g of primarily hexane is collected in the cold trap. Supercritical carbon dioxide at these processing conditions shows very good selectivity for rubber. The extract sample has a 16.81% concentration of resin, however, the feedstock yield of 5.12% is high. The percentage of rubber in the extract is 14.63% of the feedstock, which is relatively high, showing that rubber is extractable at these process conditions. These process conditions indicate that the presence of hexane co-solvent promotes the extraction of rubber. Using the ASE method, the residue has a 2.1% concentration of resin and a 1.1% concentration of rubber.

Example 5

50 ml Extraction with Hexane Co-Solvent (9900 psi, 80° C.)

12.98 g of guayule shrub feedstock is placed in an extraction vessel and extracted with carbon dioxide and 115.38 g of hexane co-solvent at a pressure of 9900 psi and a temperature of 80° C. The flow rate is 3 liters/minute. The extraction is run for thirty minutes. 0.60 g of dark green film is extracted (4.62% of feedstock). An additional 0.26 g of primarily hexane is collected in the cold trap. Supercritical carbon dioxide at these processing conditions shows very good selectivity for rubber. The extract sample has a 12.35% concentration of resin and a 4.62% yield of feedstock. The percentage of rubber in the extract is 8.97% of the feedstock and indicates that rubber is extractable at these process conditions. These process conditions further indicate that the presence of hexane co-solvent promotes the extraction of rubber. Using the ASE method, the residue has a 2.3% concentration of resin and a 1.1% concentration of rubber.

Example 6

50 ml Extraction with Hexane Co-Solvent (9800 psi, 80° C.)

13.10 g of guayule shrub feedstock is placed in an extraction vessel and extracted with carbon dioxide and 110.16 g of hexane co-solvent at a pressure of 9800 psi and a temperature of 80° C. The flow rate is 3 liters/minute. The extraction is run for one hour. 1.47 g of dark green film is extracted (11.22% of feedstock). An additional 0.14 g of primarily hexane is collected in the cold trap. Supercritical carbon dioxide at these processing conditions shows very good selectivity for rubber. The extract sample has a combined average resin concentration of slightly less than 10% and an 11.22% yield of feedstock. The percentage of rubber in the extract is 10.5% of the feedstock, indicating that rubber is highly extractable at these process conditions. These process conditions indicate that the presence of hexane co-solvent appears to promote the extraction of rubber. Using the ASE method, the residue has a 2.0% concentration of resin and a 0.8% concentration of rubber.

Example 7

50 ml Extraction with 1-Hexene Co-Solvent (9800 psi, 100° C.)

13.00 g of guayule shrub feedstock is placed in an extraction vessel and extracted with carbon dioxide and 114.16 g of 1-hexene co-solvent at a pressure of 9800 psi and a temperature of 100° C. The flow rate is 3 liters/minute. The extraction is run for one hour. 0.68 g of dark green film is extracted (5.85% of feedstock). An additional 0.44 g of primarily hexene is collected in the cold trap. Supercritical carbon dioxide at these processing conditions shows very good selectivity for rubber. The extract sample has a combined average resin concentration of 11.4% and a 5.85% feedstock yield. The percentage of rubber in the extract is 13.4% of the feedstock, indicating that rubber is highly extractable at these process conditions. These process conditions indicate that the presence of 1-hexene co-solvent promotes the extraction of rubber. Using the ASE method, the residue has a 2.0% concentration of resin and a 1.1% concentration of rubber.

Example 8

50 ml Extraction with Cyclohexane Co-Solvent (9500 psi, 100° C.)

13.00 g of guayule shrub feedstock is placed in an extraction vessel and extracted with carbon dioxide and 109.80 g of cylohexane co-solvent at a pressure of 9500 psi and a temperature of 100° C. The flow rate is 3 liters/minute. The extraction is run for one hour. 0.81 g of dark green film is extracted (6.23% of feedstock). An additional 0.40 g of primarily cyclohexane is collected in the cold trap. Supercritical carbon dioxide at these processing conditions shows very good selectivity for resin. The extract sample has a combined average resin concentration of 30.1% and a 6.23% yield of feedstock. The percentage of rubber in the extract is 7.8% of the feedstock, indicating that both resin and rubber are extractable at these process conditions. Using the ASE method, the residue has a 3.0% concentration of resin and a 3.9% concentration of rubber.

Example 9

50 ml Extraction with Iso-Octane Co-Solvent (9500 psi, 100° C.)

13.00 g of guayule shrub feedstock is placed in an extraction vessel and extracted with carbon dioxide and 110.26 g of iso-octane co-solvent at a pressure of 9500 psi and a temperature of 100° C. The flow rate is 3 liters/minute. The extraction is run for one hour. 0.71 of dark green film is extracted (5.46% of feedstock). An additional 0.17 g of primarily iso-octane is collected in the cold trap. Supercritical carbon dioxide at these processing conditions shows good selectivity for resin. The extract sample of >30.1% resin is high, as is the total yield of feedstock at 5.46%. The percentage of rubber in the extract is 3.9% of the feedstock, which was moderate compared to most other organic non-polar co-solvent experiments, indicating that iso-octane is not as efficacious a co-solvent for extracting rubber as hexane, 1-hexene, or cyclohexane. Using the ASE method, the residue has a 2.5% concentration of resin and a 4.5% concentration of rubber.

Example 10

50 ml Extraction with Water Co-Solvent, (9800 psi, 100° C.)

14.72 g of guayule shrub feedstock is placed in an extraction vessel and extracted with carbon dioxide and 7.32 g of water co-solvent at a pressure of 9800 psi and a temperature of 100° C. The flow rate is 3 liters/minute. The time of extraction is thirty minutes. 0.59 g of primarily solid yellow material is extracted (4.00% of feedstock), and an additional 0.16 g is collected in the cold trap. Supercritical carbon dioxide at these processing conditions shows high selectivity for resins. The extract sample has a 39.59% concentration of resin, indicating that water promotes the extraction of resin, and a yield of 4.00% of feedstock.

However, the percentage of rubber in the extract is only 0.83% of the feedstock. These process conditions show a very high selectivity for resin and a relatively low selectivity for rubber, indicating the presence of water promotes the extraction of resin and depresses the extraction of rubber. These process conditions are suitable for a two-step commercial process that selectively extracts resin and leaves behind the rubber for subsequent extract. The material in the cold trap is much lower in resin and rubber concentration than in the collection vessel. Using the ASE method, the residue has a 2.3% concentration of resin, and a 5.7% concentration of rubber.

Example 11

50 ml Extraction with Water Co-Solvent, (5000 psi, 60° C.)

16.26 g of guayule shrub feedstock is placed in an extraction vessel and extracted with carbon dioxide and 8.07 g of water co-solvent at a pressure of 5000 psi and a temperature of 60° C. The flow rate is 3 liters/minute. The time of extraction is 24 minutes. 0.68 g of primarily solid yellow material is extracted (4.18% of feedstock), and an additional 0.13 g is collected in the cold trap. The extract sample at 28.8% concentration of resin is not nearly as high as the previous experiment which is performed at a higher pressure and temperature. The yield at 4.18% of feedstock is among the highest.

However, the percentage of rubber in the extract is reported at only 0.37% of the feedstock which is among the lowest amount when compared to other process conditions. These process conditions show that the presence of water suppresses the extraction of the rubber, but that the higher pressure conditions are more conducive for the extraction of resin. The material in the cold trap has extremely low concentrations of resin and rubber compared to that in the collection vessel. Using the ASE method, the residue had a 2.6% concentration of resin, and a 5.8% concentration of rubber.

Example 12

50 ml Liquid Carbon Dioxide Extraction, (2000 psi, 9.2° C.)

16.1 g of guayule shrub feedstock is placed in an extraction vessel and extracted with carbon dioxide at a pressure of 2000 psi and a temperature of 9.2° C. The extract vessel and pre-heater vessel are both placed in a container with ice to perform a cold extraction, however, we are unable to achieve flow and no extract is collected. The guayule feedstock, at least at the particle size at which the test was performed, does not have an adequate percolation rate to perform the extraction. The slow percolation rate of the liquid carbon dioxide causes the bed to compress and form a plug, which prevents extraction. Liquid carbon dioxide requires the use of a specialized extractor, pelletizing of the feedstock, or a much larger particle size, in order for this liquid carbon dioxide process to work effectively.

Example 13

50 ml Extraction with Ethanol Co-Solvent, (7250 psi, 80° C.)

15.04 g of-guayule shrub feedstock is placed in an extraction vessel and extracted with carbon dioxide and 15 g of ethanol co-solvent at a pressure of 7250 psi and a temperature of 80° C. The flow rate is 3 liters/minute. The time of extraction is 45 minutes. 0.58 g of solid yellow material and dark green film is extracted (3.85% of feedstock). Supercritical carbon dioxide at these processing conditions shows average selectivity for resins. The extract sample at 30.09% concentration of resin is not as high as other experiments. The yield at 3.85% of feedstock is not as high as other process conditions utilizing higher pressure or water and other co-solvents.

However, the percentage of rubber in the extract is reported at 0.51% of the feedstock, which is extremely low, indicating that the presence of ethanol suppresses the extraction of rubber. These process conditions are suboptimal for a process designed to extract both resin and rubber, but the presence of ethanol may be beneficial for a single step process to extract a purified resin product. Using the ASE method, the residue has a 2.6% concentration of resin, and a 5.4% concentration of rubber.

Example 14

50 ml Extraction with Acetone Co-Solvent, (5000 psi, 60° C.)

15.06 g of guayule shrub feedstock is placed in an extraction vessel and extracted with carbon dioxide and 15 g of acetone co-solvent at a pressure of 5000 psi and a temperature of 60° C. The flow rate is 3 liters/minute. The time of extraction is 45 minutes. 0.63 g of dark green film is extracted (4.18% of feedstock). Supercritical carbon dioxide at these processing conditions showed extraordinary selectivity for resins. The extract sample at 40.02% concentration of resin is the highest of all the experiments. The yield at 4.81% of feedstock is among the highest within this set of screening experiments. The percentage of rubber in the extract is reported at 1.72% of the feedstock but is surpassed by several other experiments.

These process conditions indicate that the presence of acetone promotes the extraction of resin. These process conditions should be considered as a single step in a two-step process for extracting resin and rubber separately and sequentially. Using the ASE method, the residue has a 2.9% concentration of resin, and a 6.5% concentration of rubber.

Example 15

50 ml Extraction with Hexane Co-Solvent, (5000 psi, 60° C.)

16.12 g of guayule shrub feedstock is placed in an extraction vessel and extracted with carbon dioxide and 15 g of hexane co-solvent at a pressure of 5000 psi and a temperature of 60° C. The flow rate is 3 liters/minute. The time of extraction is forty-five minutes. 0.53 g of solid yellow material and dark green film is extracted (3.28% of feedstock). Supercritical carbon dioxide at these processing conditions shows very good selectivity for resins. The extract sample at 34.69% concentration of resin is among the highest of the experiments; however, the yield at 3.28% of feedstock is not as high as several other experiments.

The percentage of rubber in the extract is reported at 1.09% of the feedstock, which is relatively low, showing the rubber is still not extracted in great quantity, utilizing these particular process conditions. These process conditions indicate that the presence of relatively low concentration of hexane co-solvent appears to promote the extraction of resin and slightly promote the extraction of rubber. These process conditions should be considered as a single step in a two-step process for extracting resin and rubber separately and sequentially. Using the ASE method, the residue has a 2.9% concentration of resin and a 5.3% concentration of rubber.

Therefore, the present method of using supercritical carbon dioxide eliminates or greatly decreases the use of organic solvents which are ozone depleting and environmentally unfriendly, while providing a more effective method of separating, fractionating and purifying rubber and resins from plant materials.

Various embodiments of the invention are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s).

The foregoing description of a preferred embodiment and best mode of the invention known to the applicant at this time of filing the application has been presented and is intended for the purposes of illustration and description. It is not intended to be exhaustive or limit the invention to the precise form disclosed and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out this invention, but that the invention will include all embodiments falling within the scope of the appended claims.

What is claimed is:

1. A method for removing a non-resin biopolymer from plant material, comprising:
   contacting plant material with a compressed gas solvent compressed from about 1,500 psi to about 10,000 psi, wherein the temperature and pressure of the solvent are at supercritical conditions;
   maintaining the supercritical conditions for a sufficient time, wherein the biopolymer solubilizes with the solvent forming a supercritical solution; and
   extracting the biopolymer by percolation of the supercritical solution through a bed of the plant material and wherein the plant material is guayule.

2. The method of claim 1, wherein the solvent is carbon dioxide.

3. The method of claim 2, further including contacting the plant material with a co-solvent.

4. The method of claim 3, wherein the co-solvent is a polar co-solvent.

5. The method of claim 3, wherein the co-solvent is a non-polar co-solvent.

6. The method of claim 3, wherein the step of contacting with the solvent and the step of contacting with the co-solvent are performed either sequentially or in reverse order.

7. The method of claim 3, wherein the step of contacting with the solvent and the step of contacting with the co-solvent are performed at approximately the same time.

8. The method of claim 1, wherein the pressure is between about 5,000 and 10,000 psi.

9. The method of claim 1, wherein the temperature is between 60 and 100 degrees centigrade.

10. The method of claim 1, further comprising contacting the plant material with a co-solvent.

11. The method of claim 10, wherein the co-solvent is a polar co-solvent.

12. The method of claim 10, wherein the co-solvent is a non-polar co-solvent.

13. The method of claim 10, wherein the step of contacting with the compressed gas solvent and the step of contacting with the co-solvent are performed either sequentially or in reverse order.

14. The method of claim 10, wherein the step of contacting with the compressed gas solvent and the step of contacting with the co-solvent are performed at approximately the same time.

15. The method of claim 1, further comprising extracting a resin from the plant material to form a non-resin biopolymer and resin extraction.

16. The method of claim 15, further comprising fractionating the nonresin biopolymer and resin extraction into a non-resin biopolymer fraction and a resin fraction.

17. A method for removing a non-resin biopolymer from plant material, comprising:
   contacting plant material with a compressed gas solvent compressed from about 1,500 psi to about 10,000 psi, wherein the temperature and pressure of the solvent are at supercritical conditions;
   maintaining the supercritical conditions for a sufficient time, wherein the biopolymer solubilizes with the solvent forming a supercritical solution; and
   extracting the biopolymer by percolation of the supercritical solution through a bed of the plant material and wherein the biopolymer is rubber.

18. The method of claim 17, wherein the solvent is carbon dioxide.

19. The method of claim 17, wherein the pressure is between about 5,000 and 10,000 psi.

20. The method of claim 17, wherein the temperature is between 60 and 100 degrees centigrade.

21. The method of claim 17, further including extracting a resin from the plant material to form a non-resin biopolymer and resin extraction.

22. The method of claim 21, further comprising fractionating the non-resin biopolymer and resin extraction into a biopolymer fraction and a resin fraction.

23. A method for removing a biopolymer from plant material, comprising:
   contacting plant material with a compressed gas solvent compressed from about 1,500 psi to about 10,000 psi, wherein the temperature and pressure of the solvent are at subcritical liquid conditions;

maintaining the subcritical liquid conditions for a sufficient time, wherein the biopolymer and the solvent form a subcritical liquid solvent solution; and extracting the biopolymer by percolation of the subcritical liquid solvent solution through a bed of the plant material and wherein the plant material is guayule.

24. The method of claim 23, further comprising using an inert percolation aid.

25. The method of claim 24, wherein the percolation aid is diatomaceous earth.

26. The method of claim 23, wherein the solvent is carbon dioxide.

27. The method of claim 23, wherein the solvent is water.

28. A method for removing a biopolymer from plant material, comprising:

contacting plant material with a compressed gas solvent compressed from about 1,500 psi to about 10,000 psi, wherein the temperature and pressure of the solvent are at subcritical liquid conditions;

maintaining the subcritical liquid conditions for a sufficient time, wherein the biopolymer and the solvent form a subcritical liquid solvent solution; and extracting the biopolymer by percolation of the subcritical liquid solvent solution through a bed of the plant material and wherein the biopolymer is rubber.

29. The method of claim 28, further comprising using an inert percolation aid.

30. The method of claim 29, wherein the percolation aid is diatomaceous earth.

31. The method of claim 28, wherein the solvent is carbon dioxide.

32. The method of claim 28, wherein the solvent is water.

33. A method for removing a non-polar rubber and a polar resin from guayule, comprising:

contacting guayule with carbon dioxide in an extraction vessel, wherein the temperature in the extraction vessel is between 60 and 100 degrees centigrade and the pressure in the extraction vessel is between 5,000 and 10,000 psi;

further contacting the guayule with a co-solvent in the extraction vessel, wherein the contact with the co-solvent occurs at approximately the same time as the contact with the carbon dioxide; and extracting the rubber and resin by percolation of a formed supercritical solution through a bed of guayule, to form a rubber-resin extraction.

34. The method of claim 33, wherein the co-solvent is a non-polar solvent.

35. The method of claim 34, further comprising a third solvent, wherein the third solvent is a polar solvent.

36. The method of claim 33, wherein the co-solvent is a polar solvent.

37. The method of claim 33, further comprising fractionating the rubber-resin extraction into a rubber fraction and a resin fraction.

38. The method of claim 33, wherein the co-solvent ratio is between 3 to 10 times a pre-determined feedstock weight.

* * * * *